Patented Aug. 26, 1924.

1,506,228

UNITED STATES PATENT OFFICE.

HENRY DREYFUS, OF LONDON, ENGLAND.

MANUFACTURE OF ALKYL, ARALKYL, AND AROMATIC COMPOUNDS.

No Drawing.  Application filed August 9, 1921. Serial No. 491,003.

*To all whom it may concern:*

Be it known that I, HENRY DREYFUS, a citizen of the Swiss Republic, of London, England, have invented certain new and useful Improvements Relating to the Manufacture of Alkyl, Aralkyl, and Aromatic Compounds, of which the following is a specification.

This invention relates more particularly to the manufacture of diethyl sulphate but can also be applied for the manufacture of homologues thereof, or of corresponding aralkyl or aromatic sulphates.

It has been proposed to manufacture diethyl sulphate by making ethyl sulphuric acid with sulphuric acid and alcohol, and distilling the resulting ethyl sulphuric acid in vacuo. The yields of diethyl sulphate thus obtained are stated to be relatively poor, for example about 50 per cent.

It has further been proposed to make diethyl sulphate by combining sulphuric acid or oleum with alcohol to form ethyl sulphuric acid, transforming the ethyl sulphuric acid into its sodium salt and then distilling this salt in vacuo. The combining of sulphuric acid or oleum with alcohol necessitates much cooling, and the process is otherwise complicated and expensive.

According to the present invention I employ pyrosulphates or chlorsulphonates of alkali metals, such as pyrosulphate or chlorsulphonate of sodium, for the production of diethyl sulphate or its homologues, by bringing the pyrosulphate or chlorsulphonate into reaction with ethyl alcohol or ethyl ether, or with the corresponding alcohol or ether, and distilling, preferably under reduced pressure.

Alkali metal pyrosulphates and chlorsulphonates may, as is known, be regarded as $SO_3$ derivatives of alkali metal salts, for example, $Na_2SO_4(SO_3)$ or $NaCl(SO_3)$, and are hereinafter included in the term $SO_3$ derivatives of alkali metal salts, while the alcohols and ethers are defined as oxygen derivatives of simple aliphatic hydrocarbons wherein the oxygen is attached to at least one alkyl carbon by a single linkage.

As is known, the pyrosulphates, such as sodium pyrosulphate, can be manufactured according to various methods. The cheapest way of making sodium pyrosulphate, for example, which is a very cheap raw material, is to heat sodium bisulphate in vacuo. The pyrosulphates can also be made by combining sulphur trioxide with a sulphate, such as sodium sulphate.

In carrying out the invention with sodium pyrosulphate and alcohol for example, the pyrosulphate and alcohol may be mixed at ordinary temperature for some hours, then heated until a combination takes place between them, and finally distilled in vacuo. A high yield of diethyl sulphate can be thus obtained. Or the alcohol may be passed in the form of vapour over the pyrosulphate at a suitable temperature to cause a combination to take place, and then heated in vacuo to distil off diethyl sulphate.

It is to be understood, however, that I do not confine myself to any particular methods or details of working, and that the manner of carrying the invention into effect can be varied within wide limits.

Instead of alcohol, ether may be used.

The sodium pyrosulphate may be used in the proportion of about two molecules to two molecules of alcohol or of about one molecule of pyrosulphate to one molecule of ether. I do not confine myself to employing the materials in these proportions but may use the alcohol or ether in excess, or otherwise vary the proportions.

Instead of the pyrosulphates I may, as before mentioned, employ alkali metal chlorsulphonates, such for example as sodium chlorsulphonate. The chlorsulphonate may be used in the proportion of about two molecules chlorsulphonate to two molecules of alcohol, or about one molecule chlorsulphonate to one molecule of ether. I do not however, limit myself to these proportions but I may use the alcohol or ether in excess or otherwise vary the proportions. Mixtures of pyrosulphates and chlorsulphonates may be used for the purpose of the invention. Also mixtures of the alcohol and ether may be employed.

It is further to be understood that the invention may be applied for the production of homologues of diethyl sulphate by using instead of ethyl alcohol or ethyl ether the corresponding homologues, such as methyl, propyl or butyl alcohol or ether.

What I claim and desire to secure by Letters Patent is:

1. Process for the manufacture of dialkylsulfate, comprising bringing an $SO_3$ derivative of an alkali metal salt into reaction with an oxygen derivative of a simple aliphatic hydrocarbon wherein the oxygen is attached to at least one alkyl carbon by a single linkage, and distilling.

2. Process for the manufacture of dialkyl-sulfate, comprising bringing an $SO_3$ derivative of an alkali metal salt into reaction with a simple aliphatic alcohol and distilling.

3. Process for the manufacture of dialkyl sulfate, comprising bringing an alkali metal pyrosulfate into reaction with an oxygen derivative of a simple aliphatic hydrocarbon wherein the oxygen is attached to at least one alkyl carbon by a single linkage, and distilling.

4. Process for the manufacture of dialkyl sulfate, comprising bringing an alkali metal pyrosulfate into reaction with a simple aliphatic alcohol and distilling.

5. Process for the manufacture of diethyl sulfate, comprising bringing an $SO_3$ derivative of an alkali metal salt into reaction with an oxygen derivative of ethane wherein the oxygen is attached to at least one ethylic carbon by a single linkage, and distilling.

6. Process for the manufacture of diethyl sulfate, comprising bringing sodium pyrosulfate into reaction with ethyl alcohol and distilling.

In testimony whereof I have hereunto subscribed my name.

HENRY DREYFUS.